United States Patent [19]

Yokota

[11] Patent Number: 4,466,711

[45] Date of Patent: Aug. 21, 1984

[54] GAUSS TYPE LENS

[75] Inventor: Hideo Yokota, Kanagawa, Japan

[73] Assignee: Canon Kabushiki Kaisha, Tokyo, Japan

[21] Appl. No.: 419,419

[22] Filed: Sep. 17, 1982

[30] Foreign Application Priority Data

Oct. 9, 1981 [JP]  Japan .................................. 56-161890

[51] Int. Cl.³ .......................... G02B 9/60; G02B 9/62; G02B 13/20

[52] U.S. Cl. ..................................... 350/464; 350/431; 350/467

[58] Field of Search ................................ 350/467, 464

[56] References Cited

U.S. PATENT DOCUMENTS

| | | | |
|---|---|---|---|
| 4,260,223 | 4/1981 | Hamanishi | 350/467 X |
| 4,390,251 | 6/1983 | Kato | 350/467 |
| 4,395,094 | 7/1983 | Hamanishi | 350/467 |

FOREIGN PATENT DOCUMENTS 2701424  7/1977  Fed. Rep. of Germany ...... 350/467

Primary Examiner—John K. Corbin
Assistant Examiner—Scott J. Sugarman
Attorney, Agent, or Firm—Toren, McGeady and Stanger

[57] ABSTRACT

A Gauss type objective having, from front to rear, a 1st lens of positive power convex toward the front, a 2nd lens of positive power also convex toward the front, a 3rd lens of negative power strongly concave toward the rear, a 4th lens of negative power strongly concave toward the front, a 5th lens of positive power strongly convex toward the rear, and a 6th lens having at least one element of positive power, whereby the 4th, 5th and 6th lenses are made axially movable for focusing, and good correction of aberrations is achieved.

2 Claims, 43 Drawing Figures

FIG.1a  FIG.1b  FIG.1c
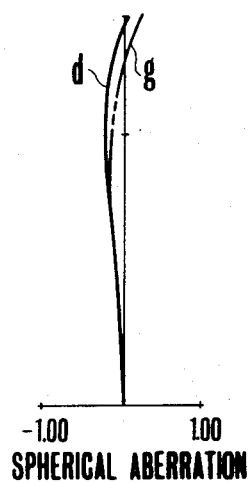
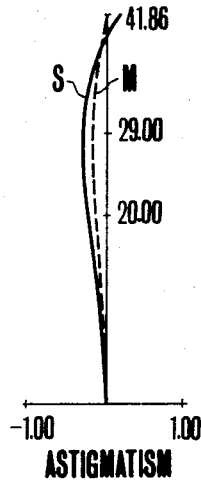
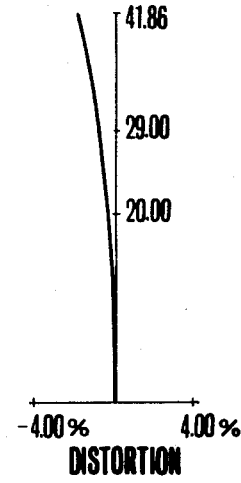
FIG.1d
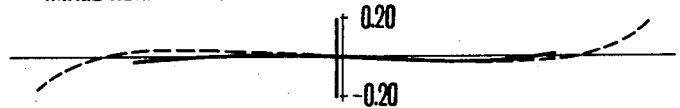
FIG.1e
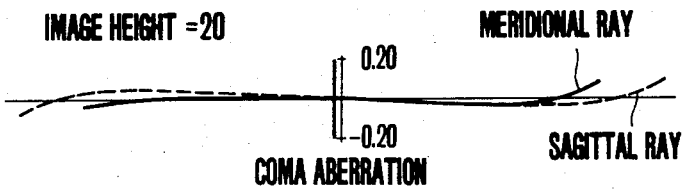

FIG.2a
EFFECTIVE F-No. =1.91
FIG.2b
IMAGE HEIGHT
FIG.2c
IMAGE HEIGHT
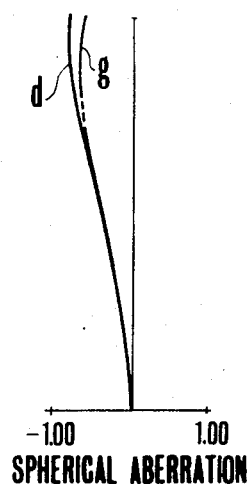
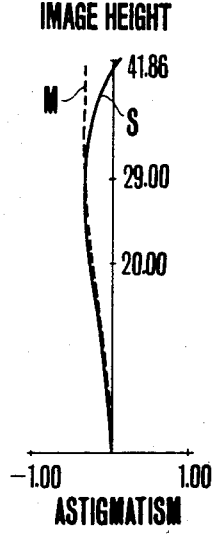
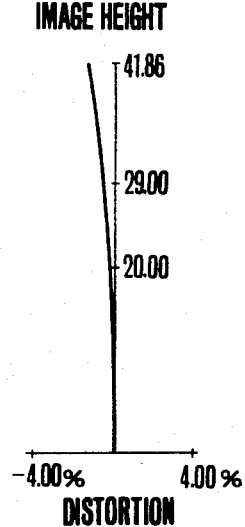
SPHERICAL ABERRATION    ASTIGMATISM    DISTORTION
FIG.2d
IMAGE HEIGHT = 29
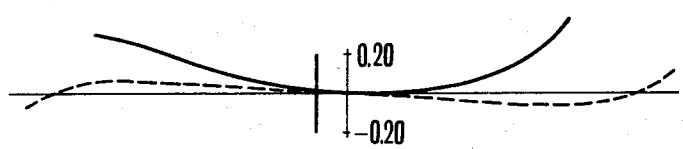
FIG.2e
IMAGE HEIGHT = 20
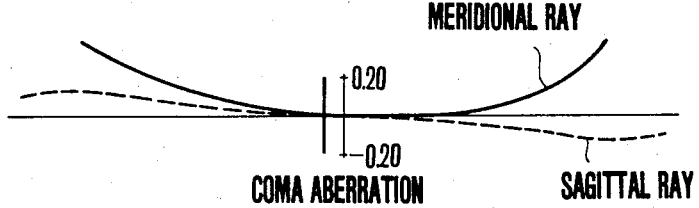
COMA ABERRATION    MERIDIONAL RAY    SAGITTAL RAY F-No=1.85
SPHERICAL ABERRATION IMAGE HEIGHT w=23.2°
ASTIGMATISM IMAGE HEIGHT w=23.2°
DISTORTION FIG.4d   IMAGE HEIGHT = 29

FIG.4e   IMAGE HEIGHT = 20

COMA ABERRATION   MERIDIONAL RAY   SAGITTAL RAY

FIG.5a  FIG.5b  FIG.5c
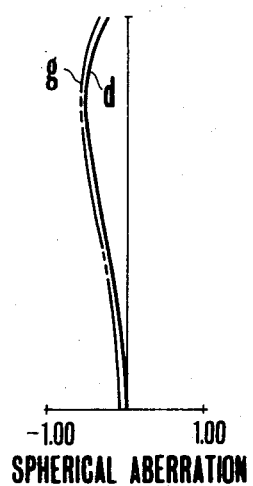 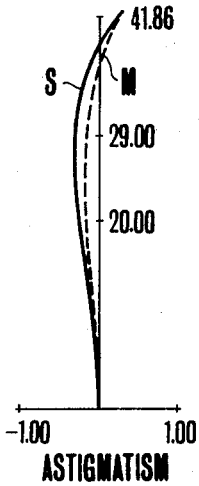 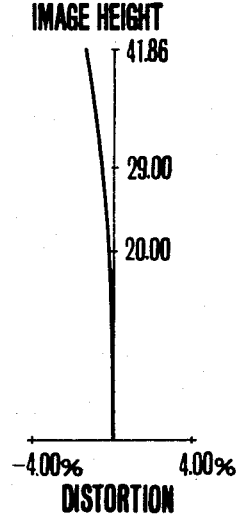
FIG.5d
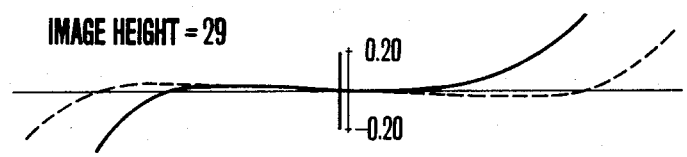
FIG.5e
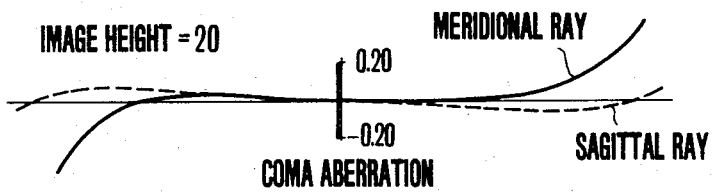

FIG.7d  IMAGE HEIGHT = 29

FIG.7e  IMAGE HEIGHT = 20

FIG.8a  FIG.8b  FIG.8c
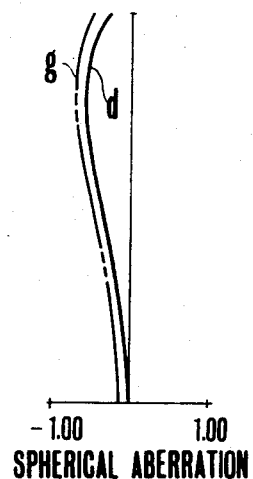
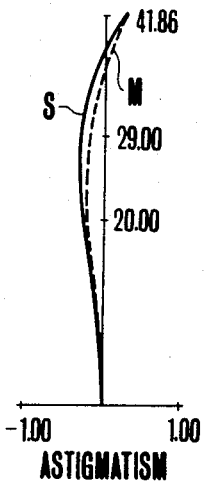
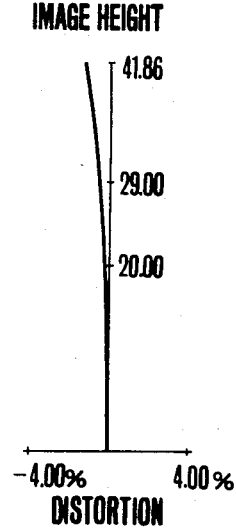
FIG.8d
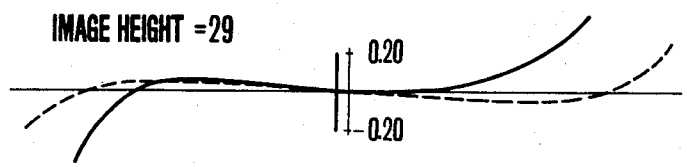
FIG.8e
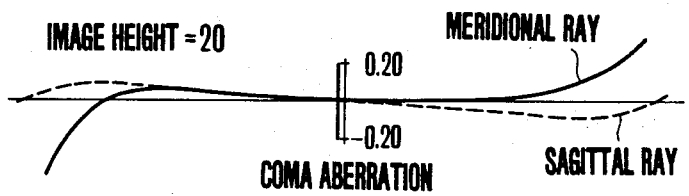

F-No.=1.85

SPHERICAL ABERRATION

IMAGE HEIGHT w=23.2°

ASTIGMATISM

IMAGE HEIGHT w=23.2°

DISTORTION

FIG.10d  IMAGE HEIGHT =29

FIG.10e  IMAGE HEIGHT =20

COMA ABERRATION

EFFECTIVE F-No. = 1.91

SPHERICAL ABERRATION

IMAGE HEIGHT

ASTIGMATISM

IMAGE HEIGHT

DISTORTION

COMA ABERRATION

GAUSS TYPE LENS

BACKGROUND OF THE INVENTION

1. Field of the Invention

This invention relates to improvements of the Gauss type objective widely used as the standard lens for single lens reflex cameras, and, more particularly, to a Gauss type objective employing a quick and easy focusing method.

2. Description of the Prior Art

In the past, the so-called Gauss type lens has found wide use as the standard lens for single lens reflex cameras.

This was because, at a total angular field coverage on the order of 45°, good image quality could be relatively easily assured over the entire area of the picture format, and also because it was relatively easy to make the lens faster than 2 in F-number. A further reason was because it was also easy to secure a relatively long back focal distance as is required for the single lens reflex camera.

Most of the Gauss type objectives employ the focusing method of moving the entire lens system in unison with the diaphragm.

An alternative method of focusing by moving part of the lens system has been proposed as, for example, in U.S. Pat. No. 250,389. But it is difficult to say that it gives a sufficient performance to the objective for the single lens reflex camera. As far as the Gauss type objectives are concerned, to obtain a good imaging performance and a sufficient back focal distance, the following conditions are generally satisfied:

$$2f < f_F < 3f, \quad 0.8f < f_R < 1.2f$$

where f is the focal length of the entire lens system; and $f_F$ and $f_R$ are focal lengths of the front and rear lens groups with the diaphragm therebetween. An example of the objective having such power distribution is known in Japanese Laid Open Patent Sho No. 52-146620. In the practical embodiment of this patent, those of the lens members which lie in rear of the diaphragm are made movable for focusing down to as short an object distance as 16f without causing mechanical interference with the front lens group ahead the diaphragm.

FIGS. 1a to 1e and FIGS. 2a to 2e are graphic representations of the various aberrations of the typical Gauss type objective when focused to an infinitely distant object and an object at a distance of 16f respectively. It is evident from these aberration curves that as focusing is effected down to shorter object distances, the spherical aberration becomes under-corrected, and the outward coma is objectionably increased in the intermediate to marginal zone of the picture format. Even when the diaphragm is closed down this outward coma still remains appreciable, giving its influence on the imaging performance. On the other hand, recently in the art of photographic cameras, an automatic focusing technique has been developed and is in progress, and even some of the single lens reflex cameras come to employ automatic focusing control mechanisms. In this case, if the focusing method is by bodily moving the objective lens, a large stress is laid on the lens operating mechanism. To avoid such disadvantage, the mass of the movable lens is required to be as light as possible. In this point of view, the method of focusing by moving part of the lens system is desired.

As the Gauss type objective having the focusing provision in part of the rear lens group thereof, mention may be made of the ones disclosed in Japanese Laid Open Patent Sho Nos. 56-27108 and 56-114918.

SUMMARY OF THE INVENTION

The present invention has for its general object the provision of a Gauss type objective having a high relative aperture of at least 2 in F-number with the assurance of a sufficiently high grade imaging performance as the standard objective for the single lens reflex camera, wherein focusing is made possible by moving those of the lens components which lie behind a diaphragm and good correction of aberrations is achieved.

BRIEF DESCRIPTION OF THE DRAWINGS

FIGS. 1a to 1e and FIGS. 2a to 2e are graphic representations of the various aberrations of the conventional Gauss type objective with an object respectively at infinity and at a distance equal to 16 times the focal length of the objective.

FIGS. 4a to 4e and FIGS. 5a to 5e are graphic representations of the various aberrations of the objective of FIG. 3 with an object respectively at infinity and at a distance of 16f.

FIGS. 7a to 7e and FIGS. 8a to 8e are graphic representations of the various aberrations of the objective of FIG. 6 with an object at infinity and at a distance of 16f respectively.

FIGS. 10a to 10e and FIGS. 11a to 11e are graphic representations of the various aberrations of the objective of FIG. 9 with an object at infinity and at a distance of 16f respectively.

DETAILED DESCRIPTION OF THE PREFERRED EMBODIMENTS

Figure 3:
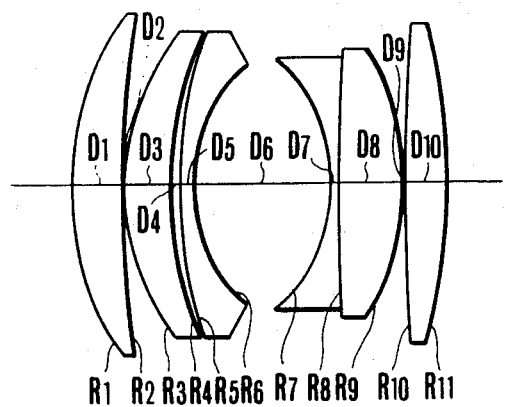
FIG. 3 is a longitudinal section view of an embodiment of an objective according to the present invention.
Figure 3:
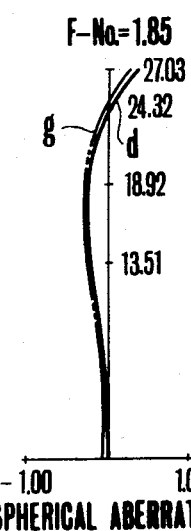
Figure 4A:
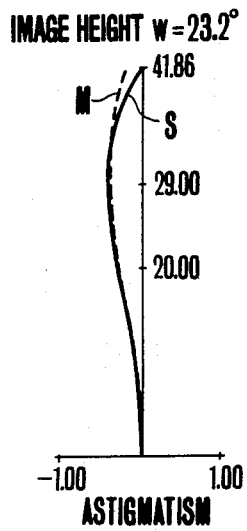
Figure 4B:
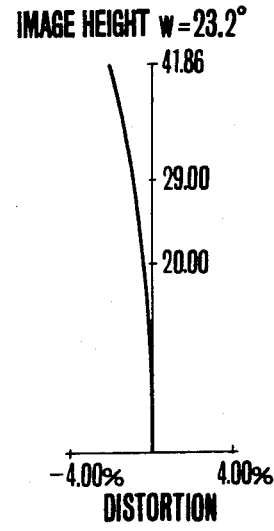
Figure 4C:
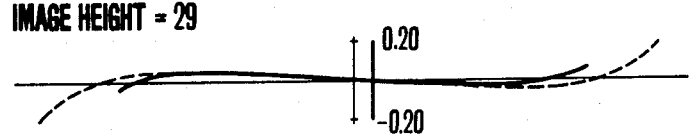
Figure 4C:
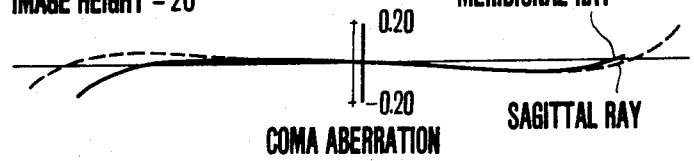
Figure 6:
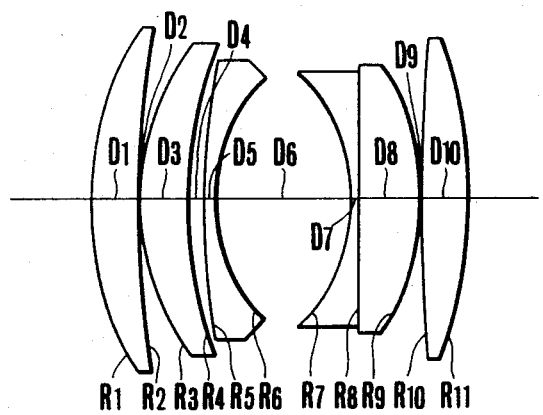
FIG. 6 is a longitudinal section of another embodiment of the objective according to the present invention.
Figure 7A:
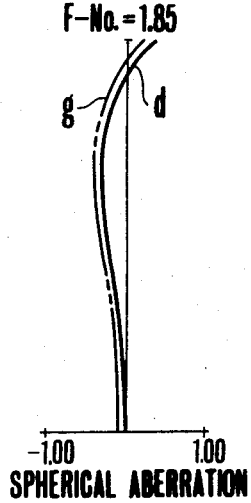
Figure 7B:
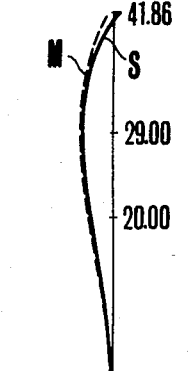
Figure 7C:
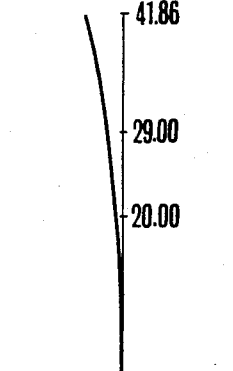
Figure 7C:
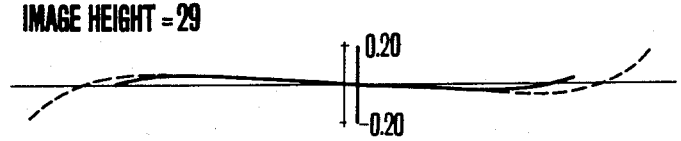
Figure 7C:
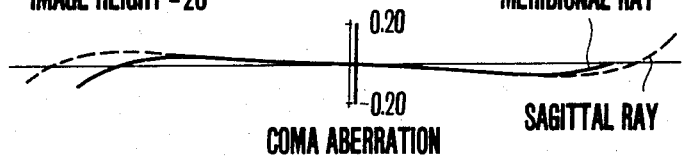
Figure 9:
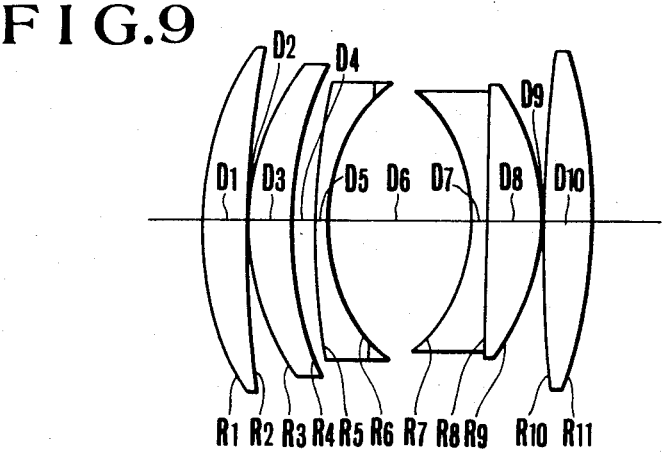
FIG. 9 is a longitudinal section view of a 3rd embodiment of the objective according to the present invention.
Figure 10A:
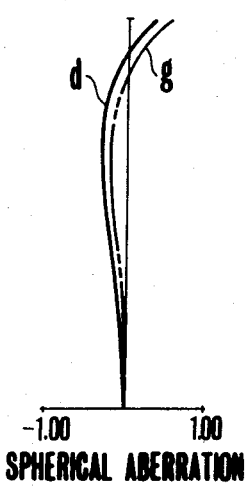
Figure 10B:
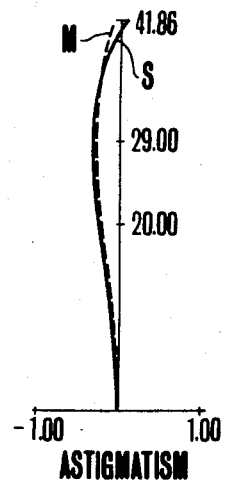
Figure 10C:
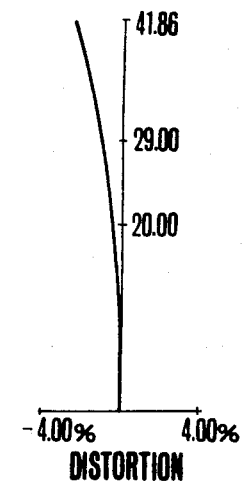
Figure 10C:
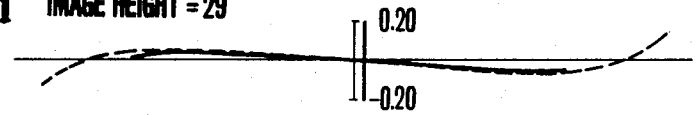
Figure 10C:
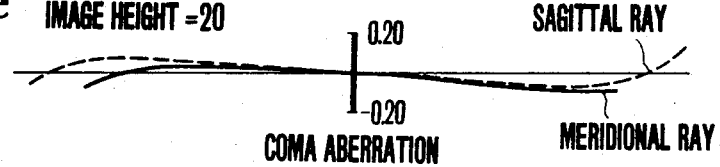
Figure 11A:
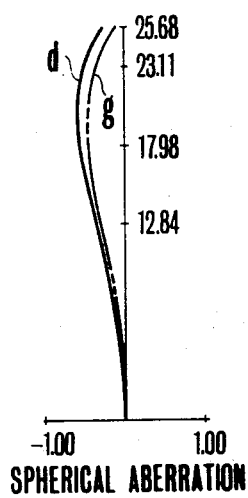
Figure 11B:
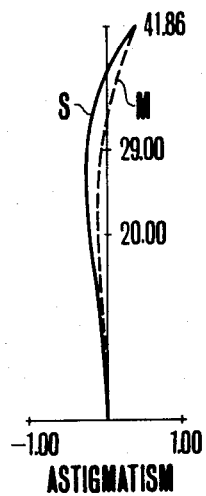
Figure 11C:
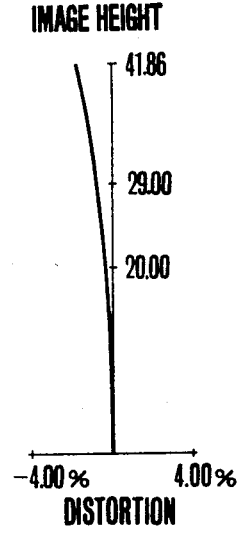
Figure 11D:
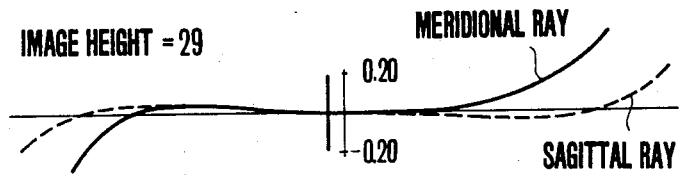
Figure 11E:
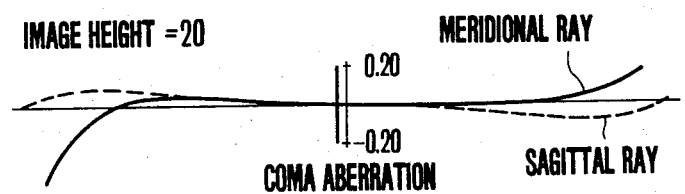

To accomplish the object of the present invention, the form and the construction and arrangement of the objective has a feature that the objective has, from front to rear, a 1st lens of positive power with its convex curvature toward the front, a 2nd lens of positive power also with its convex curvature toward the front, a 3rd lens of negative power with its strong concave curvature toward the rear, a 4th lens of negative power with its strong concave curvature toward the front, a 5th lens of positive power with its strong convex curvature toward the rear, and a 6th lens having at least one lens element of positive power, and the 4th to 6th lenses are made movable as a unit to effect focusing. Thereby a Gauss type objective which is well corrected for aberrations is achieved.

Further in the Gauss type objective according to the present invention, letting f denote the focal length of the entire lens system, $\alpha 7'$ the reduced inclination angle of a light ray emerging from the 1st lens surface of the 4th lens and $\alpha 9'$ the reduced inclination angle of the light ray emerging from the 2nd lens surface of the 5th lens, the conditions:

$$-1.6/f < \alpha 7' < -0.8/f \quad (1)$$

$$0.1/f < \alpha 9' < 0.45/f \quad (2)$$

are satisfied to achieve a further improvement of the aberration correction.

The present invention will next be described in greater detail in connection with embodiments of the Gauss type objective thereof.

According to Matsui's rule of expression concerning with the paraxial ray tracing across each lens surface (in the book entitled "Lens Design Method" Kyoritsu Shuppan Co. 1972), let us define the following formulae:

$$\alpha v' = \alpha v + h v \psi v$$

$$\alpha v+1 = \alpha v', \ h v+1 = h v - e v' \alpha v'$$

where the suffix $v$ represents the lens surface number; $\alpha v$ and $\alpha v'$ are the reduced angles of incidence and emergence on and from the $v$-th lens surface and $v'$-th lens surface; $h v$ is the height of incidence of a paraxial ray on the lens; and $ev' = dv/Nv$ wherein $dv$ is the axial separation between the $v$-th and $(v+1)$th lens surfaces, and $Nv$ is the refractive index. With the use of the above factors, when the paraxial ray tracing starts with the initial values $\alpha_1 = 0$ and $h_1 = 1$, the Gauss type objective employing the lens form of the invention satisfies all the above-described conditions (1) and (2) for the factors $\alpha 7'$ and $\alpha 9'$, namely, the reduced inclination angles of emergence from the 1st surface of the 4th lens and the 2nd surface of the 5th lens respectively. Condition (1) represents numerical limits for the one of the lens surfaces which lies just behind the aperture stop in the Gauss type objective of the invention. This lens surface is responsible for good correction of the various aberrations despite the fast objective, and at the same time for lengthening the back focal distance. When the upper limit of condition (1) is exceeded, the back focal distance cannot be taken sufficiently, and no improved results as for use in single lens reflex cameras are attained. Of the objectives for range finder cameras which have no large restriction on the back focal distance, there are many of which the equivalent factor to $\alpha 7'$ in condition (1) is at most on the order of about $-0.6/f$. When the lower limit of condition (1) is exceeded, a sufficiently long back focal distance is insured and therefore it is advantageous for single lens reflex cameras, but strong comatic aberration is produced, hindering a sufficiently high grade imaging performance from being obtained. Condition (2) is to suppress variation of aberrations with independent movement of the rear lens group behind the diaphragm as far as the Gauss type lens design is concerned. When the upper limit of condition (2) is exceeded, as focusing is effected to shorter object distances, the outward coma is very rapidly increased, and the spherical aberration too becomes under-corrected objectionably. When the lower limit is exceeded, as focusing is effected to shorter object distances, positive field curvature and positive astigmatism are produced in the intermediate to the marginal zone of the picture format.

Next, numerical data in accordance with which three examples of specific objectives of the invention can be constructed are given for the radii of curvature, R, the axial thicknesses and air separations, D, and the refractive indices, N, and the Abbe numbers, $v$, of the glasses of the lens elements with the usual subscripts numbered consecutively from front to rear.

In the present invention, it is desirable to control the reduced angles of emergence within the specified ranges by the above-described conditions (1) and (2). To achieve a better correction of aberrations, however, it is preferred that the ranges of the above-described conditions (1) and (2) are narrowed to:

$$-1.5/f < \alpha 7' < -0.9/f \quad (3)$$

$$0.2/f < \alpha 9' < 0.35/f \quad (3)$$

within which the reduced angles of emergence fall. What is meant by the numerical limits of conditions (3) and (4) is the same as that described in connection with conditions (1) and (2), except that better correction of aberrations than with the conditions (1) and (2) can be achieved.

EXAMPLE 1 f = 100

| | | | | | | | |
|---|---|---|---|---|---|---|---|
| R 1 | 48.70 | D 1 | 8.87 | N1 | 1.66672 | $v1$ | 48.30 |
| R 2 | 213.43 | D 2 | 0.29 | N2 | 1.65844 | $v2$ | 50.90 |
| R 3 | 40.80 | D 3 | 8.08 | N3 | 1.68893 | $v3$ | 31.10 |
| R 4 | 66.44 | D 4 | 1.68 | N4 | 1.68893 | $v4$ | 31.10 |
| R 5 | 113.72 | D 5 | 1.93 | N5 | 1.80610 | $v5$ | 40.90 |
| R 6 | 27.99 | D 6 | 22.62 | N6 | 1.69350 | $v6$ | 53.20 |
| R 7 | −29.84 | D 7 | 1.48 | | | | |
| R 8 | 645.53 | D 8 | 10.82 | | | | |
| R 9 | −42.09 | D 9 | 0.29 | | | | |
| R 10 | 297.54 | D 10 | 7.36 | | | | |
| R 11 | −93.82 | | | | | | |

Paraxial Tracing:

| | $\alpha$ | | H |
|---|---|---|---|
| R 1 | 0.0 | $\times 10^{-2}$ | 1.00 |
| R 2 | 1.36 | " | 0.92 |
| R 3 | 1.07 | " | 0.92 |
| R 4 | 2.57 | " | 0.79 |
| R 5 | 1.77 | " | 0.76 |
| R 6 | 2.24 | " | 0.74 |
| R 7 | 0.41 | " | 0.64 |
| R 8 | −1.08 | " | 0.65 |
| R 9 | −1.06 | " | 0.72 |
| R 10 | 0.31 | " | 0.72 |
| R 11 | 0.48 | " | 0.70 |

In this example, $\alpha 7' = \alpha 8 \approx -1.08/f$, $\alpha 9' = \alpha 10 \approx 0.314/f$

EXAMPLE 2 f = 100

| | | | | | | | |
|---|---|---|---|---|---|---|---|
| R 1 | 51.92 | D 1 | 8.27 | N1 | 1.77250 | $v1$ | 49.60 |
| R 2 | 177.89 | D 2 | 0.29 | N2 | 1.65844 | $v2$ | 50.90 |
| R 3 | 44.22 | D 3 | 7.61 | N3 | 1.68893 | $v3$ | 31.10 |
| R 4 | 69.50 | D 4 | 2.88 | N4 | 1.68893 | $v4$ | 31.10 |
| R 5 | 116.33 | D 5 | 1.93 | N5 | 1.80610 | $v5$ | 40.90 |
| R 6 | 29.23 | D 6 | 22.96 | N6 | 1.69350 | $v6$ | 53.20 |
| R 7 | −29.73 | D 7 | 1.48 | | | | |
| R 8 | −1732.35 | D 8 | 10.16 | | | | |
| R 9 | −42.09 | D 9 | 0.29 | | | | |
| R 10 | 328.72 | D 10 | 7.65 | | | | |
| R 11 | −84.54 | | | | | | |

Paraxial Tracing:

| | $\alpha$ | | H |
|---|---|---|---|
| R 1 | 0.0 | $\times 10^{-2}$ | 1.00 |
| R 2 | 1.48 | " | 0.93 |
| R 3 | 1.08 | " | 0.92 |
| R 4 | 2.46 | " | 0.81 |
| R 5 | 1.69 | " | 0.76 |
| R 6 | 2.14 | " | 0.74 |
| R 7 | 0.40 | " | 0.64 |

-continued

| | | | |
|---|---|---|---|
| R 8 | −1.10 | " | 0.65 |
| R 9 | −1.10 | " | 0.72 |
| R 10 | 0.27 | " | 0.71 |
| R 11 | 0.42 | " | 0.70 |

In this example, $\alpha_7' = \alpha_8 \approx -1.1/f$, $\alpha_9' = \alpha_{10} \approx 0.274/f$

EXAMPLE 3 f = 100

| | | | | | | | |
|---|---|---|---|---|---|---|---|
| R 1 | 53.25 | D 1 | 7.90 | N1 | 1.77250 | ν1 | 49.60 |
| R 2 | 188.58 | D 2 | 0.29 | N2 | 1.65844 | ν2 | 50.90 |
| R 3 | 44.09 | D 3 | 7.41 | N3 | 1.68893 | ν3 | 31.10 |
| R 4 | 65.52 | D 4 | 3.53 | N4 | 1.74000 | ν4 | 28.30 |
| R 5 | 110.60 | D 5 | 1.93 | N5 | 1.80610 | ν5 | 40.90 |
| R 6 | 29.76 | D 6 | 25.16 | N6 | 1.72000 | ν6 | 43.70 |
| R 7 | −28.76 | D 7 | 2.57 | | | | |
| R 8 | −1439.63 | D 8 | 8.99 | | | | |
| R 9 | −38.77 | D 9 | 0.29 | | | | |
| R 10 | 256.88 | D 10 | 8.05 | | | | |
| R 11 | −91.15 | | | | | | |

Paraxial Tracing:

| | α | | H |
|---|---|---|---|
| R 1 | 0.0 | × 10$^{-2}$ | 1.00 |
| R 2 | 1.45 | " | 0.93 |
| R 3 | 1.06 | " | 0.93 |
| R 4 | 2.45 | " | 0.82 |
| R 5 | 1.63 | " | 0.76 |
| R 6 | 2.10 | " | 0.74 |
| R 7 | 0.39 | " | 0.64 |
| R 8 | −1.25 | " | 0.65 |
| R 9 | −1.25 | " | 0.72 |
| R 10 | 0.24 | " | 0.72 |
| R 11 | 0.44 | " | 0.70 |

In this example, $\alpha_7' = \alpha_8 \approx -1.25/f$, $\alpha_9' = \alpha_{10} \approx 0.245/f$ As has been described above, the present invention is to provide a Gauss type objective having the focusing provision at only those of the components which lie behind the diaphragm, while still permitting achievement of a sufficiently high grade imaging performance as required for the standard lens of the single lens reflex camera by fulfilling the requirement for the lens form and the above described conditions.

In the embodiments of the invention, through the 2nd and 3rd lenses are in separation from each other, an alternative type in which they are cemented together as usual in the ordinary lens design may be employed when the object of the invention can be accomplished. Further, the 5th and 6th lenses may each be constructed with a plurality of positive lens elements. Even if this is the case, the object of the present invention can be accomplished as well.

What I claim:

1. A Gauss-type objective, comprising:
   a first lens component being a meniscus lens of positive refractive power with its convex curvature toward an object;
   a second lens component arranged on the image side of said first lens component, and being a meniscus lens of positive refractive power with its convex curvature toward the object;
   a third lens component arranged on the image side of said second lens component and being a meniscus lens of negative refractive power with its convex curvature toward the object;
   a fourth lens component arranged on the image side of said third lens component and being a lens of negative refractive power with its concave curvature toward the object;
   a fifth lens component arranged on the image side of said fourth lens component and being a lens of positive refractive power with its convex curvature toward the image; and
   a sixth lens component arranged on the image side of said fifth component and comprising at least one lens of positive refractive power;
   whereby said objective performs focusing by moving only said fourth, fifth and sixth lens components which are arranged on the image side of a diaphragm and satisfies the conditions:

$$-1.6/f < \alpha_7' < -0.8/f$$

$$0.1/f < \alpha_9' < 0.45/f$$

wherein
   f represents a focal distance of the whole lens system, $\alpha_7'$ represents a reduced inclination angle of a light ray at a first lens surface of said fourth lens component and $\alpha_9'$ represents a reduced inclination angle of a light ray at a second surface of said fifth lens component.

2. A Gauss-type objective according to claim 1, wherein said fourth, fifth and sixth lens components move unitedly.

* * * * *